United States Patent [19]
Glover et al.

[11] Patent Number: 6,028,124
[45] Date of Patent: Feb. 22, 2000

[54] RADIATION CURABLE COMPOSITIONS

[75] Inventors: Shedric Oneal Glover; Chi-long Lee; Wen-hong Tong, all of Midland, Mich.

[73] Assignee: Dow Corning Corporation, Midland, Mich.

[21] Appl. No.: 09/199,645

[22] Filed: Nov. 25, 1998

[51] Int. Cl.[7] .................................................. C08F 2/46
[52] U.S. Cl. ............................ 522/181; 522/25; 522/31; 522/15; 427/516; 427/517; 427/521
[58] Field of Search .................................. 522/181, 107, 522/25, 31, 15; 427/516, 517, 521

[56] References Cited

U.S. PATENT DOCUMENTS

| | | | |
|---|---|---|---|
| 3,855,052 | 12/1974 | Mestetsky | 428/352 |
| 4,057,672 | 11/1977 | Creekmore et al. | 428/220 |
| 4,108,747 | 8/1978 | Crivello et al. | 204/159.18 |
| 4,954,364 | 9/1990 | Stein et al. | 427/515 |
| 5,010,118 | 4/1991 | Desorcie et al. | 522/31 |
| 5,082,686 | 1/1992 | Desorcie et al. | 427/110 |
| 5,491,178 | 2/1996 | Swedo et al. | 522/74 |

FOREIGN PATENT DOCUMENTS

| | | |
|---|---|---|
| 0522703 | 6/1992 | European Pat. Off. . |
| 0562922 | 3/1993 | European Pat. Off. . |

OTHER PUBLICATIONS

Nelson, Carter, & Scranton. "Journal of Polymer Science. Part A: Polymer Chemistry." vol. 33, 247–256.

Ciba–Geigy Corp. "photoinitiator for UV Curing: A Formulator's Guide." p. 13.

*Primary Examiner*—James J. Seidleck
*Assistant Examiner*—Sanza L. McClendon
*Attorney, Agent, or Firm*—Timothy J. Troy

[57] ABSTRACT

This invention relates to a radiation curable compositions. More particularly this invention relates to radiation curable compositions comprising a vinyl ether compound which is free of silicon atoms, a cationic photoinitiator, a free radical photoinitiator, and dodecylphenol. The radiation curable compositions of this invention are useful for coating a thin layer film that has potential for many applications in the coating industry.

20 Claims, No Drawings

6,028,124

RADIATION CURABLE COMPOSITIONS

FIELD OF THE INVENTION

This invention relates to a radiation curable compositions. More particularly this invention relates to radiation curable compositions comprising a vinyl ether compound which is free of silicon atoms, a cationic photoinitiator, a free radical photoinitiator, and dodecylphenol. The radiation curable compositions of this invention are useful for coating a thin layer film that has potential for many applications in the coating industry.

BACKGROUND OF THE INVENTION

The curing rate of radiation curable compositions for coating applications or adhesive applications is a very important factor in determining the effectiveness of the composition. The problem with free radical curing systems is their inhibition in the presence of oxygen and thus these systems require costly inert gas facilities to ensure a satisfactory cure rate. On the other hand, cationic curing systems have no oxygen inhibition problems but have the problem of moisture sensitivity, i.e. the cure rate decreases with an increase in the relative humidity of air.

Cationic ultraviolet initiated photopolymerization of vinyl ethers in the presence of an onium salt initiator is well known in the literature. Desorcie et al. in U.S. Pat. No. 5,010,118 disclose the use of organic phenols in combination with polyaryliodonium salts, an epoxysilicone and an alkanediol to from a curable mixture. Specifically Desorcie et al. disclose the use of epoxysilicones, a polyaryliodoniumhexafluorometal or metalloid salt substituted with at least one nuclear bound alkoxy radical having at least 8 carbon atoms selected from the group consisting of diaryliodonium and triarylsulfonium salts, a compatibilizer which is a mixture of an 8–20 carbon alkyl phenol and a 4–12 carbon alkanediol to form a curable mixture when exposed to UV radiation.

Crivello in U.S. Pat. No. 4,108,747 discloses that aryl onium salts in combination with cationically polymerizable groups such as epoxides, vinyl ethers, or N-vinyl compounds are polymerizable under ultraviolet radiation. Specifically, the Crivello discloses the use of certain triphenyl sulfonium or diphenyl iodonium salts having anions derived from strong organic acids as photoinitiators for a variety of cationically polymerizable materials. The cationic polymerizable organic material can be selected from the group consisting of epoxy resins, vinyl organic monomers, vinyl organic prepolymers, cyclic organic ethers, cyclic organic esters, cyclic organic sulfides, cyclic amines and organosilicon cyclics in combination with an effective amount of triaryl onium salt of the general formula $((R_a)(R^1)_b(R^2)_cS)+(XSO_3)-$ or $((R^3)_d(R^4)_3I)+(XSO_3)-$.

Nelson, Carter, and Scranton, in the *Journal of Polymer Science.: Part A: Polymer Chemistry*, Vol. 33, 247–256 (1995), disclose the photosensitization of the iodonium salt, bis(4-dodecylphenyl) iodonium hexafluoroantimonate, with anthracene in the photopolymerization of the divinyl ether, 3,6,9,12-tetraoxatetradeca-1,13-diene, commonly referred to as DVE-3.

Ciba-Giga Corporation in *photoinitiator for UV Curing, A Formulator's Guide* (p. 13), recommends the use of sensitizers when using their cationic photoinitiator Igracure® 261 ($\eta^5$-2,4-cyclopentadien-1-yl)[(1,2,3,4,5,6-$\eta$)-(1-methylethyl)benzene]-iron(+)-hexafluorophosphate(-1).

Eckberg in EP0522703 A2 teaches the use of using reactive phenols such as 4-dodecylphenol alone or in combination with an epoxy functional organic compound preferably, 1,2 epoxydodecane and further containing a photosensitizer which is a benzophenone or diaryl ketone derivative as a diluent for iodonium photocatalysts. These compositions are useful for photopolymerizing epoxy functional silicones which are useful as release coatings.

In contrast to the above described compositions, the radiation curable compositions of this invention have a good curing rate in moist air without requiring the protection afforded by an inert gas facility.

SUMMARY OF THE INVENTION

This invention relates to radiation curable compositions comprising a vinyl ether compound which is free of silicon atoms, a cationic photoinitiator, a free radical photoinitiator, and dodecylphenol.

It is an object of this invention to produce radiation curable compositions which are useful as coating compositions.

It is an object of this invention to produce radiation curable compositions which have a good curing rate in moist air and do not require the protection afforded by an inert gas facility.

DETAILED DESCRIPTION OF THE INVENTION

This invention relates to a radiation curable composition comprising: (A) a vinyl ether compound which is free of silicon atoms, (B) a cationic photoinitiator, (C) a free radical photoinitiator, and (D) dodecylphenol.

By vinyl ether compound as used herein is meant any compound which contains at least one vinyl ether group having the formula —ROCH=$CH_2$ wherein R is a divalent hydrocarbon radical having from 2 to 20 carbon atoms, but which does not contain any silicon atoms.

Thus component (A) can be selected from the group consisting of ethyl vinyl ether, propyl vinyl ether, butyl vinyl ether, isobutyl vinyl ether, dodecyl vinyl ether, octadecyl vinyl ether, ethylene glycol monovinyl ether, diethylene glycol divinyl ether, butanediol monovinyl ether, butanediol divinyl ether, hexanediol divinyl ether, ethylene glycol butyl vinyl ether, triethylene glycol methyl vinyl ether, cyclohexanedimethanol divinyl ether, 2-ethylhexyl vinyl ether, poly-THF-divinyl ether 290, Pluriol-E-200-divinyl ether, cyclohexyl vinyl ether, tert-butyl vinyl ether, tert-amyl vinyl ether, ethylene glycol divinyl ether, diethylene glycol monovinyl ether, hexanediol monovinyl ether, tetraethylene glycol divinyl ether, trimethylol propane trivinyl ether, aminopropyl vinyl ether, and 2-diethylaminoethyl vinyl ether.

Preferably Component (A) is a vinyl ether compound having the formula $(CH_2=CHOR)_a CR^2_{4-a}$ wherein R is a divalent hydrocarbon radical having from 1 to 20 carbon atoms, $R^2$ is selected from the group consisting of hydrogen and a monovalent hydrocarbon radical having from 1 to 20 carbon atoms, and a has a value of 1 to 3.

Divalent hydrocarbon radicals suitable as R are exemplified by alkylene radicals such as ethylene, propylene, butylene, pentylene, trimethylene, 2-methyltrimethylene, pentamethylene, hexamethylene, 3-ethyl-hexamethylene, octanethylene, —$CH_2(CH_3)CH$—, —$CH_2CH(CH_3)CH_2$—, —$(CH_2)_{18}$—, and cycloalkylene radicals such as cyclohexylene, arylene radicals such as phenylene, combinations of divalent hydrocarbon radicals such as benzylene. Examples of suitable divalent halohydrocarbon radicals also include any divalent hydrocarbon radical wherein one or more hydrogen atoms have been replaced by halogen, such as fluorine, chlorine or bromine exemplified by $CH_2CH_2CF_2CF_2CH_2CH_2$—. Each R can be the same or different as desired.

Monovalent hydrocarbon radicals suitable as $R^2$ are exemplified by alkyl radicals such as methyl, ethyl, propyl, butyl, hexyl, octyl, decyl, dodecyl, tetradecyl, hexadecyl, and octadecyl, cycloaliphatic radicals such as cyclohexyl, aryl radicals such as phenyl, tolyl, and xylyl, aralkyl radicals such as benzyl and phenylethyl, and olefinic hydrocarbon radicals such as vinyl, allyl, methallyl, butenyl, and hexenyl, octenyl, cyclohexenyl and styryl. Alkenyl radicals are preferably terminally unsaturated. The monovalent hydrocarbon radical can also be any monovalent hydrocarbon radical noted above which has at least one of its hydrogen atoms replaced with a halogen, such as fluorine, chlorine, or bromine, and these monovalent hydrocarbon radicals are exemplified by $CF_3CH_2CH_2$— and $C_4F_9CH_2CH_2$—. Each $R^2$ radical can be the same or different, as desired.

Preferably R is an alkylene group having the formula —$(CH_2)_b$— wherein b has a value of 1 to 20, d has a value of 1, and $R^2$ is hydrogen.

It is preferred for purposes of this invention that from 20 to 99 weight percent (wt%) of the vinyl ether compound described above be used, and it is highly preferred that from 85 to 90 wt% of this compound be employed, said wt% being based on the total weight of the radiation curable composition.

Component (B) in the composition of this invention is cationic photoinitiator. Suitable cationic photoinitiators are selected from the group consisting of onium salts, diaryliodonium salts of sulfonic acids, triarylsulfonium salts of sulfonic acids, diaryliodonium salts of boronic acids, and triarylsulfonium salts of boronic acids.

The onium salts are preferably selected from the group consisting of $R^3_2I+MX_n—$, $R^3_3S+MX_n—$, $R^3_3Se+MX_n—$, $R^3_4P+MX_n—$, and $R^3_4N+MX_n—$, wherein each $R^3$ is an organic radical having from 1 to 30 carbon atoms exemplified by aromatic carbocyclic radicals having from 6 to 20 carbon atoms. Each $R^3$ can be substituted with from 1 to 4 monovalent hydrocarbon radicals exemplified by alkoxy radicals having from 1 to 8 carbon atoms, alkyl radicals having from 1 to 8 carbon atoms, nitro, chloro, bromo, cyano, carboxyl, mercapto, and aromatic heterocyclic radicals exemplified by pyridyl, thiophenyl, and pyranyl. The symbol M in the formulae hereinabove are metals or metalloids which include transition metals exemplified by Sb, Fe, Sn, Bi, Al, Ga, In, Ti, Zr, Sc, V, Cr, Mn, Cs, rare earth metals exemplified by lanthanides, for example, Cd, Pr, and Nd, and metalloids exemplified by B, P, and As. $MX_n$— is a non-basic, non-nucleophilic anion exemplified by $BF_4—$, $PF_6—$, $AsF_6—$, $SbF_6—$, $SbCl_6—$, $HSO_4—$, $ClO_4—$, $FeCl_4=$, $SnCl_6—$, and $BiCl_5=$.

Preferred onium salts are exemplified by bis-diaryl iodonium salts, for example, bis(dodecyl phenyl) iodonium hexafluoroarsenate, bis(dodecylphenyl) iodonium hexafluoroantimonate, and dialkylphenyl iodonium hexafluoroantimonate.

Diaryliodonium salts of sulfonic acids, triarylsulfonium salts of sulfonic acids, diaryliodonium salts of boronic acids, and triarylsulfonium salts of boronic acids are also suitable as the cationic photoinitiator(B). Preferred diaryliodonium salts of sulfonic acid are diaryliodonium salts of perfluoroalkylsulfonic acids and diaryliodonium salts of aryl sulfonic acids. Preferred diaryliodonium salts of perfluoroalkylsulfonic acids are exemplified by diaryliodonium salts of perfluorobutanesulfonic acid, diaryliodonium salts of perfluoroethanesulfonic acid, diaryliodonium salts of perfluoro-octanesulfonic acid, and diaryliodonium salts of trifluoromethane sulfonic acid. Preferred diaryliodonium salts of aryl sulfonic acids are exemplified by diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid are triarylsulfonium salts of perfluoroalkylsulfonic acids and triarylsulfonium salts of aryl sulfonic acids. Preferred triarylsulfonium salts of perfluoroalkylsulfonic acids are exemplified by triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids are exemplified by triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids, and triarylsulfonium salts of boronic acids are compounds such as those disclosed in European Patent Application No. 0562922. Preferred diaryliodonium salts of boronic acids include diaryliodonium salts of perhaloarylboronic acids and preferred triarylsulfonium salts of boronic acids are the triarylsulfonium salts of perhaloarylboronic acid.

Preferably the amount of cationic photoinitiator (B) is from 0.1 to 5 wt% based on the total weight of the composition, and it is highly preferred to use from 1 to 3 wt% based on the total weight of the radiation curable composition.

Component (C) in the composition of this invention is a free radical photoinitiator. The free radical photoinitiators of this invention can be any benzoins exemplified by benzoin alkyl ethers, acetophenones exemplified by dialkoxyacetophenones, dichloroacetophenones, and trichloroacetophenones, benzils exemplfied by benzil ketals, quinones, and O-acylated-α-oximinoketones. Preferably the free radical photoinitiator is a compound having the formula

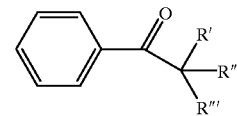

wherein R' is selected from the group consisting of —H, an alkoxy group, and a halogen atom, R" is selected from the group consisting of —OH, an alkoxy group, and a halogen atom, and R'" is selected from the group consisting of —H, an alkyl group, and a halogen atom. Preferred embodiments of this compound are (i) where R' is —H, R" is —OH and R'" is methyl or phenyl, (ii) where R' is —H, R" is an alkoxy group and R'" is phenyl (for benzoin alkyl ethers), (iii) where both R' and R" are alkoxy groups and R'" is phenyl (for benzil ketals), (iv) where both R' and R" are alkoxy groups and R'" is —H (for dialkoxyacetophenones), and (v) where both R' and R" are —Cl and R'" is —Cl or —H (for di- and tri- chloroacetophenones). It is especially preferred for the compositions that component (C) is Darocure® 1173 (2-hydroxy-2-methyl-1-phenyl-propan-1-one).

Preferably the amount of free radical photoinitiator (C) is from 0.5 to 5 wt% based on the total weight of the composition, and it is highly preferred to use from 1 to 3 wt% based on the total weight of the radiation curable composition.

Component (D) in the composition of this invention is dodecylphenol. For the purposes of this invention, "dodecylphenol" denotes a compound having the formula $C_{12}H_{25}C_6H_4OH$ or a mixture comprising isomers of a compound having the formula $C_{12}H_{25}C_6H_4OH$.

Preferably the amount of dodecylphenol (D) is from 0.5 to 10 wt% based on the total weight of the composition, and it is highly preferred to use from 1 to 5 wt% based on the total weight of the radiation curable composition.

The radiation curable compositions of this invention can also contain ingredients exemplified by reinforcing and extending fillers, hydrocarbons and halohydrocarbons, colorants, dyes, preservatives, fragrances, stabilizers, adhesion modifiers, or diluents.

The radiation curable compositions of this invention can be prepared by mixing the materials described hereinabove and any optional components in any order, using any suitable mixing means, such as a spatula, a drum roller, a mechanical stirrer, a three-roll mill, a sigma blade mixer, a bread dough mixer, or a two-roll mill.

This invention further relates to a method of making a radiation curable composition comprising (I) mixing components (A)–(D) described hereinabove. Components (A)–(D) are as described above, including preferred embodiments and amounts thereof.

The present invention further relates to a method of making an article of manufacture comprising (I) applying a radiation curable composition comprising components (A)–(D) described hereinabove, to a solid substrate to form a coating, and (II) exposing the coating to an energy source selected from the group consisting of (i) actinic radiation and (ii) actinic radiation in combination with heat in an amount sufficient to cure the coating. Components (A)–(D) are as described above, including preferred embodiments and amounts thereof.

The coating may be applied by any suitable manner known in the art, such as by spreading, brushing, extruding, spraying, gravure, kiss-roll and air-knife.

The solid substrate can be a flexible sheet material such as paper, polyolefin film, polyolefin-coated paper, foil, cellulosic materials such as wood, cardboard and cotton, metallic materials such as aluminum, copper, steel and silver, siliceous materials such as glass and stone, and synthetic polymer materials such as polyolefins, polyamides, polyesters and polyacrylates. As to form, the solid substrate can be substantially sheet-like, such as a peelable release liner for pressure sensitive adhesive; a fabric or a foil; or substantially three-dimensional in form.

By actinic radiation it is meant ultraviolet light; electron beam radiation; or alpha-, beta-, gamma- or x-rays. By heat it is meant infrared radiation, hot-air, microwave radiation, etc. Of course actinic radiation is frequently accompanied by heat and the use of a combination of the two falls within the scope and spirit of the present invention. Herein the term "cure", as applied to the composition and method of this invention, generally denotes a chemical change which leads to a change in the state of the composition from a liquid to a solid. Curing itself may be achieved in any of the known ways, including passing a coated substrate under the desired source of radiation, for example a UV lamp, at a predetermined rate and exposing a completely coated substrate to radiation by switching on the required energy source for a predetermined time.

The radiation curable compositions of this invention are useful for coating a thin layer film which has potential for many applications in the coating industry such as adhesion, abrasion resistance, chemical resistance, or release properties depending on the structure of the polymer in the composition.

In the examples hereinbelow, all amounts (parts and percentages) are by weight unless otherwise indicated.

EXAMPLES

Examples 1–8

The following compositions were prepared using the following general procedure. To a suitable container, an amount of dodecyl vinyl ether (denoted DDVE in Table 1 below) and 60/40 weight to weight mixture of tolyl (dodecylphenyl) iodonium trifluoromethanesulfonate diluted in dodecylphenol, a cationic photocatalyst, (denoted "triflate" in Table 1 below), were added and mixed thoroughly. Dodecylphenol (denoted DDP in Table 1 below) was added at the level specified and mixed thoroughly. Next Darocure® 1173 (2-hydroxy-2-methyl-1-phenyl-propan-1-one from Ciba Geigy, Terrytown, N.Y. and denoted 1173 in Table 1 below), a free radical photoinitiator, was added and mixed thoroughly. The amount in grams of each of the above components is listed in Table 1 below. Approximately 1.1 milligrams of sample was transferred to an aluminum differential scanning calorimeter pan. The sample was inserted into a TA differential scanning photocalorimeter (DPC) equipped with a high intensity mercury arc lamp. Dry compressed air or moist air (dry air bubbled through water at room temperature (about 22–23° C.)) at a rate of 100 cc/min was introduced into the DPC chamber. The sample was irradiated at an intensity of 35 mW/cm². Cure rate and extent of cure was determined from the slope and the maximum peak height of the exothermic peak, respectively. The results are listed in Table 1 below. The slope (w/g/min) provides a measure of the cure rate, whereas the peak height (w/g) gives the measure of the extent of cure, i.e. higher values represent faster cure rates and a higher extent of cure, respectively.

TABLE 1

| | | | | | Atmosphere | | | |
| | | | | | Dry | | Wet | |
| Example | DDV(gms) | Triflate(gms) | DDP(gms) | 1173(gms) | Slope | Peak Ht. | Slope | Peak Ht. |
| --- | --- | --- | --- | --- | --- | --- | --- | --- |
| 1 | 0.99 | 0.01 | 0 | 0 | 362 | 14 | 6 | 1 |
| 2 | 0.98 | 0.01 | 0.01 | 0 | 312 | 12 | 12.5 | 1.2 |
| 3 | 0.96 | 0.01 | 0.03 | 0 | 400 | 16 | 14.4 | 1.1 |
| 4 | 0.94 | 0.01 | 0.05 | 0 | 399 | 17 | 66 | 3.5 |
| 5 | 0.98 | 0.01 | 0 | 0.01 | 987 | 29 | 762 | 24 |
| 6 | 0.97 | 0.01 | 0.01 | 0.01 | 1223 | 26 | 796 | 20 |
| 7 | 0.95 | 0.01 | 0.03 | 0.01 | 1016 | 24 | 529 | 18 |
| 8 | 0.93 | 0.01 | 0.05 | 0.01 | 941 | 24 | 304 | 14 |

A comparison of Examples 5–8 versus Examples 1–4 clearly demonstrate the dramatic effect of Darocure 1173 on the cure rate and extent of cure under both wet and dry cure conditions. Such an effect is most significant under wet cure conditions where the cure rate and the extent of cure increases 5 to 60 times and 4 to 24 times, respectively, depending on the concentration of DDP. The merit of such a dramatic improvement in cure rate would become very obvious during the summer months when the relative humidity is high.

That which is claimed is:

1. A radiation curable composition comprising:
   (A) a vinyl ether compound which is free of silicon atoms;
   (B) a cationic photoinitiator;
   (C) a free radical photoinitiator; and
   (D) dodecylphenol.

2. A composition according to claim 1, wherein (A) is selected from the group consisting of ethyl vinyl ether, propyl vinyl ether, butyl vinyl ether, isobutyl vinyl ether, dodecyl vinyl ether, octadecyl vinyl ether, ethylene glycol monovinyl ether, diethylene glycol divinyl ether, butanediol monovinyl ether, butanediol divinyl ether, hexanediol divinyl ether, ethylene glycol butyl vinyl ether, triethylene glycol methyl vinyl ether, cyclohexanedimethanol divinyl ether, 2-ethylhexyl vinyl ether, poly-THF-divinyl ether 290, Pluriol-E-200-divinyl ether, cyclohexyl vinyl ether, tert-butyl vinyl ether, tert-amyl vinyl ether, ethylene glycol divinyl ether, diethylene glycol monovinyl ether, hexanediol monovinyl ether, tetraethylene glycol divinyl ether, trimethylol propane trivinyl ether, aminopropyl vinyl ether, and 2-diethylaminoethyl vinyl ether.

3. A composition according to claim 1, wherein (A) is a vinyl ether compound having the formula $(CH_2=CHOR)_a CR^2_{4-a}$ wherein R is a divalent hydrocarbon radical having from 1 to 20 carbon atoms, $R^2$ is selected from the group consisting of hydrogen or a monovalent hydrocarbon radical having from 1 to 20 carbon atoms, and a has a value of 1 to 3.

4. A composition according to claim 3, wherein R is an alkylene group having the formula $-(CH_2)_b-$ wherein b has a value of 1 to 20, a has a value of 1, and $R^2$ is hydrogen.

5. A composition according to claim 1, wherein (A) is a compound having the formula $CH_2=CHO(CH_2)_{11}CH_3$.

6. A composition according to claim 1, wherein (B) is selected from the group consisting of onium salts, diaryliodonium salts of sulfonic acids, triarylsulfonium salts of sulfonic acids, diaryliodonium salts of boronic acids, and triarylsulfonium salts of boronic acids.

7. A composition according to claim 1, wherein (B) is selected from the group consisting of bis(dodecyl phenyl) iodonium hexafluoroarsenate, bis(dodecylphenyl) iodonium hexafluoroantimonate, dialkylphenyl iodonium hexafluoroantimonate, diaryliodonium salts of perfluorobutanesulfonic acid, diaryliodonium salts of perfluoroethanesulfonic acid, diaryliodonium salts of perfluorooctanesulfonic acid, diaryliodonium salts of trifluoromethane sulfonic acid, diaryliodonium salts of para-toluene sulfonic acid, diaryliodonium salts of dodecylbenzene sulfonic acid, diaryliodonium salts of benzene sulfonic acid, diaryliodonium salts of 3-nitrobenzene sulfonic acid, triarylsulfonium salts of perfluorobutanesulfonic acid, triarylsulfonium salts of perfluoroethanesulfonic acid, triarylsulfonium salts of perfluoro-octanesulfonic acid, triarylsulfonium salts of trifluoromethane sulfonic acid, triarylsulfonium salts of para-toluene sulfonic acid, triarylsulfonium salts of dodecylbenzene sulfonic acid, triarylsulfonium salts of benzene sulfonic acid, triarylsulfonium salts of 3-nitrobenzene sulfonic acid, diaryliodonium salts of perhaloarylboronic acids, and triarylsulfonium salts of perhaloarylboronic acid.

8. A composition according to claim 1, wherein (B) is selected from the group consisting of diaryliodonium salts of trifluoromethane sulfonic acid and triarylsulfonium salts of trifluoromethane sulfonic acid.

9. A composition according to claim 1, wherein (C) is a compound having the formula

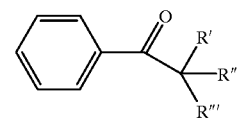

wherein R' is selected from the group consisting of —H, an alkoxy group, and a halogen atom, R" is selected from the group consisting of —OH, an alkoxy group, and a halogen atom, and R'" is selected from the group consisting of —H, an alkyl group, and a halogen atom.

10. A composition according to claim 1, wherein (C) is 2-hydroxy-2-methyl-1-phenyl-propan-1-one.

11. A method of making a radiation curable composition comprising:
   (I) mixing:
      (A) a vinyl ether compound which is free of silicon atoms;
      (B) a cationic photoinitiator;
      (C) a free radical photoinitiator; and
      (D) dodecylphenol.

12. A method according to claim 11, wherein (A) is selected from the group consisting of ethyl vinyl ether, propyl vinyl ether, butyl vinyl ether, isobutyl vinyl ether, dodecyl vinyl ether, octadecyl vinyl ether, ethylene glycol monovinyl ether, diethylene glycol divinyl ether, butanediol monovinyl ether, butanediol divinyl ether, hexanediol divinyl ether, ethylene glycol butyl vinyl ether, triethylene glycol methyl vinyl ether, cyclohexanedimethanol divinyl ether, 2-ethylhexyl vinyl ether, poly-THF-divinyl ether 290, Pluriol-E-200-divinyl ether, cyclohexyl vinyl ether, tert-butyl vinyl ether, tert-amyl vinyl ether, ethylene glycol divinyl ether, diethylene glycol monovinyl ether, hexanediol monovinyl ether, tetraethylene glycol divinyl ether, trimethylol propane trivinyl ether, aminopropyl vinyl ether, and 2-diethylaminoethyl vinyl ether.

13. A method according to claim 11, wherein (A) is a vinyl ether compound having the formula $(CH_2=CHOR)_a CR^2_{4-a}$ wherein R is a divalent hydrocarbon radical having from 1 to 20 carbon atoms, $R^2$ is selected from the group consisting of hydrogen or a monovalent hydrocarbon radical having from 1 to 20 carbon atoms, and a has a value of 1 to 3.

14. A method according to claim 11, wherein (B) is selected from the group consisting of bis(dodecyl phenyl) iodonium hexafluoroarsenate, bis(dodecylphenyl) iodonium hexafluoroantimonate, dialkylphenyl iodonium hexafluoroantimonate, diaryliodonium salts of perfluorobutanesulfonic acid, diaryliodonium salts of perfluoroethanesulfonic acid, diaryliodonium salts of perfluorooctanesulfonic acid, diaryliodonium salts of trifluoromethane sulfonic acid, diaryliodonium salts of para-toluene sulfonic acid, diaryliodonium salts of dodecylbenzene sulfonic acid, diaryliodonium salts of benzene sulfonic acid, diaryliodonium salts of 3-nitrobenzene sulfonic acid, triarylsulfonium salts of perfluorobutanesulfonic acid, triarylsulfonium salts of perfluoroethanesulfonic acid, triarylsulfonium salts of perfluoro-octanesulfonic acid, triarylsulfonium salts of trifluoromethane sulfonic acid, triarylsulfonium salts of para-toluene sulfonic acid, triarylsulfonium salts of dodecylbenzene sulfonic acid, triarylsulfonium salts of benzene sulfonic acid, triarylsulfonium salts of 3-nitrobenzene sulfonic acid, diaryliodonium salts of perhaloarylboronic acids, and triarylsulfonium salts of perhaloarylboronic acid.

15. A method according to claim 11, wherein (C) is a compound having the formula

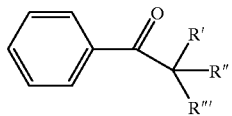

wherein R' is selected from the group consisting of —H, an alkoxy group, and a halogen atom, R" is selected from the group consisting of —OH, an alkoxy group, and a halogen atom, and R'" is selected from the group consisting of —H, an alkyl group, and a halogen atom.

16. A method according to claim 11, wherein (C) is 2-hydroxy-2-methyl-1-phenyl-propan-1-one.

17. A method of making an article of manufacture comprising:
 (I) applying a radiation curable composition comprising:
  (A) a vinyl ether compound which is free of silicon atoms;
  (B) a cationic photoinitiator;
  (C) a free radical photoinitiator; and
  (D) dodecylphenol.
 to a solid substrate to form a coating; and
 (II) exposing the coating to an energy source selected from the group consisting of (i) actinic radiation and (ii) actinic radiation in combination with heat in an amount sufficient to cure the coating.

18. A method according to claim 17, wherein (C) is a compound having the formula

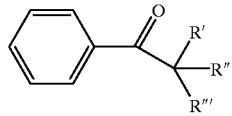

wherein R' is selected from the group consisting of —H, an alkoxy group, and a halogen atom, R" is selected from the group consisting of —OH, an alkoxy group, and a halogen atom, and R'" is selected from the group consisting of —H, an alkyl group, and a halogen atom.

19. A method according to claim 17, wherein (C) is 2-hydroxy-2-methyl-1-phenyl-propan-1-one.

20. An article of manufacture produced in accordance with the method of claim 17.

* * * * *